(12) United States Patent
Bai et al.

(10) Patent No.: US 11,487,003 B2
(45) Date of Patent: Nov. 1, 2022

(54) ENVELOPE REGULATION IN A FREQUENCY-MODULATED CONTINUOUS-WAVE RADAR SYSTEM

(71) Applicant: Ay Dee Kay LLC, Aliso Viejo, CA (US)

(72) Inventors: Jian Bai, Gilbert, AZ (US); Nader Rohani, Scottsdale, AZ (US)

(73) Assignee: Ay Dee Kay LLC, Aliso Viejo, CA (US)

( * ) Notice: Subject to any disclaimer, the term of this patent is extended or adjusted under 35 U.S.C. 154(b) by 353 days.

(21) Appl. No.: 16/738,200

(22) Filed: Jan. 9, 2020

(65) Prior Publication Data

US 2020/0292659 A1 Sep. 17, 2020

Related U.S. Application Data

(60) Provisional application No. 62/817,035, filed on Mar. 12, 2019.

(51) Int. Cl.
*G01S 13/931* (2020.01)
*G01S 7/02* (2006.01)
*G01S 13/34* (2006.01)
*G01S 7/35* (2006.01)

(52) U.S. Cl.
CPC ............ *G01S 13/931* (2013.01); *G01S 7/023* (2013.01); *G01S 7/35* (2013.01); *G01S 13/34* (2013.01)

(58) Field of Classification Search
CPC ............ G01S 7/023; G01S 7/35; G01S 13/34
See application file for complete search history.

(56) References Cited

U.S. PATENT DOCUMENTS

| 10,191,142 | B2 | 1/2019 | Eshraghi et al. | |
|---|---|---|---|---|
| 2013/0135141 | A1* | 5/2013 | Selesnick | G01S 7/282 |
| | | | | 342/202 |
| 2019/0293749 | A1* | 9/2019 | Itkin | G01S 13/931 |
| 2021/0156982 | A1* | 5/2021 | Stettiner | G01S 7/356 |
| 2021/0215824 | A1* | 7/2021 | Bai | G01V 1/301 |
| 2021/0331943 | A1* | 10/2021 | Nie | B01D 53/48 |
| 2021/0334297 | A1* | 10/2021 | Bai | G06F 16/9535 |

FOREIGN PATENT DOCUMENTS

WO 20008079004 A1 7/2008

* cited by examiner

*Primary Examiner* — Marcus E Windrich
(74) *Attorney, Agent, or Firm* — Steven Stupp

(57) ABSTRACT

A radar system that can block false echoes includes: a local oscillator configured to generate a chirp signal comprising a plurality of chirps, each having a corresponding envelope; a transmitter configured to transmit a signal corresponding to the chirp signal; and a modulation circuit configured to modulate the transmitted signal by regulating a magnitude of one or more portions of the chirp envelopes in a predetermined pattern such that the radar system can discern false echoes which do not match the pattern.

22 Claims, 8 Drawing Sheets

ENVELOPE REGULATION IN A FREQUENCY-MODULATED CONTINUOUS-WAVE RADAR SYSTEM

CROSS-REFERENCE TO RELATED APPLICATION

This application claims priority benefit of U.S. provisional application No. 62/817,035, which was filed on Mar. 12, 2019, and which is entirely incorporated by reference herein.

FIELD

This application pertains generally to frequency-modulated continuous-wave radar systems. This application pertains particularly to frequency-modulated continuous-wave radar systems in which chirp signal envelopes are regulated so as to attend to interference.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Attempts to detect and mitigate the effects of interference have not been wholly satisfactory. Thus, there is room for improvement in the art.

SUMMARY

In accordance with an example of this disclosure, a transceiver system comprises: a local oscillator configured to generate a chirp signal, wherein the chirp signal comprises a plurality of chirps, and wherein each of the chirps has a corresponding envelope; a transmitter, wherein the transmitter is configured to transmit a signal corresponding to the chirp signal; and a modulation circuit, wherein the modulation circuit is configured to modulate the transmitted signal by regulating a magnitude of one or more portions of the chirp envelopes in a predetermined pattern.

In accordance with another example of this disclosure, a signal modulation method comprises: generating a chirp signal using a local oscillator, wherein the chirp signal comprises a plurality of chirps, and wherein each of the chirps has a corresponding envelope; transmitting, using a transmitter, a signal corresponding to the chirp signal; and modulating the transmitted signal, using a modulation circuit, wherein modulating the transmitted comprises regulating a magnitude of one or more portions of the chirp envelopes in a predetermined pattern.

In accordance with another example of this disclosure, a non-transitory computer readable medium stores instructions executable by a processor, wherein the instructions comprise instructions to: generate a chirp signal using an oscillation circuit, wherein the chirp signal comprises a plurality of chirps, and wherein each of the chirps has a corresponding envelope; transmit a signal corresponding to the chirp signal from a transmitter; and cause a modulation circuit to modulate the transmitted signal by regulating a magnitude of one or more portions of the chirp envelopes in a predetermined pattern.

Figure 1:
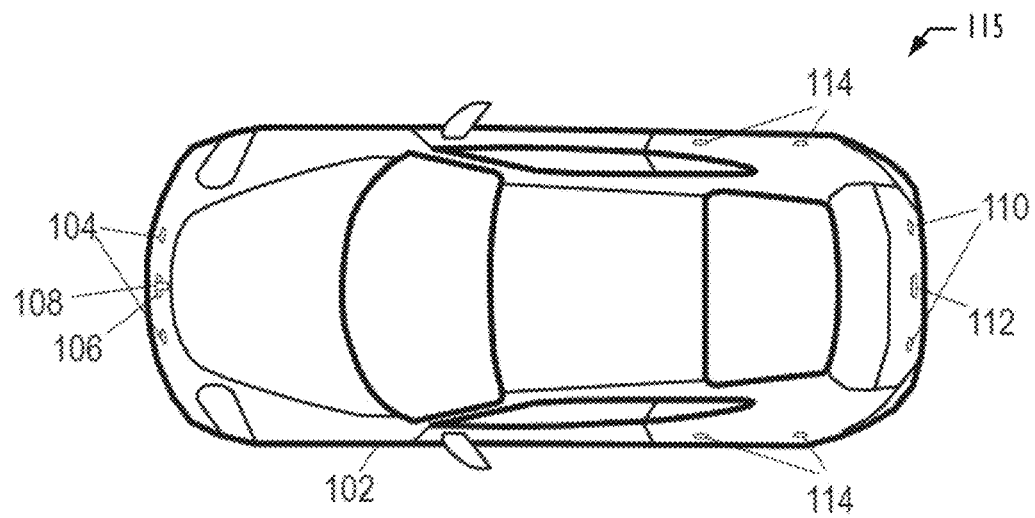
FIG. 1 illustrates a vehicle equipped with radar sensors, in accordance with an example of this disclosure.

The accompanying drawings and following detailed description do not limit the disclosure, but on the contrary, they provide the foundation for understanding all modifications, equivalents, and alternatives falling within the scope of the appended claims. Specific configurations, parameter values, and examples are explanatory, not restrictive.

DETAILED DESCRIPTION

In accordance with one or more examples of this disclosure, regulation of signal envelopes is used to improve the efficiency of power consumption by radar transmitters. In at least one example, regulation of chirp signal envelopes is used to improve the efficiency of power consumption by radar transmitters.

In some examples, regulation of signal envelopes is used to mitigate radar-to-radar interference. In at least one example, envelope regulation is used to reduce interference caused by one or more non-linear regions of chirped radar signals in a manner that is efficient with regard to power consumption. In at least one example of this disclosure, signal envelope regulation reduces the false detection rate of radar receivers. In some examples, false detection due a target echo's interference is minimized.

In one or more examples of this disclosure, a radar transmitter includes a phase rotator, a bi-phase modulator, a variable gain amplifier, a switch, a power amplifier driver, a power amplifier, a digital signal processor (DSP). In at least one example, a radar transmitter also includes a digital controller. In some examples, one or more digital controllers are included in the DSP. In at least one example, the phase rotator is used for digital phase modulation. In some examples, a radar transmitter uses a wave modulated power amplifier in a digital envelope modulation scheme. In at least one example, a power amplifier is driven into saturation mode to enable envelope modulation of the power amplifier. In at least one example, the saturation mode is a class AB saturation mode. In at least one example, the saturation mode is a class B saturation mode. When operating in saturation mode, the power amplifier's output envelope has a linear relationship with the power amplifier's supply voltage. In at least one example, a power amplifier has a cascade topology in which, the bias voltage at the drain of the power amplifier's common source transistor tracks the variation in supply voltage. In at least one example, the bias voltage is close to half of the supply voltage.

In at least one example of this disclosure, envelope modulation and demodulation in a radar transmitter is imposed from chirp to chirp using the DSP. In some examples, the DSP resides on a chip. In accordance with one or more examples of this disclosure, demodulation occurs after a range fast Fourier transform (FFT) operation is performed. In some examples, a demodulated envelope pattern is compared or correlated with an original modulating signal. In at least one example, when the demodulated signal corresponds to a false echo, even if the demodulated signal has the same frequency of the transmitted signal after a the range FFT operation, the demodulated signal will not match the envelope coding pattern of the transmitted signal, making the signal corresponding to the false echo distinguishable from a signal which originated at the radar transmitter and was reflected by a target.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid-range sensing (e.g., for rear collision warning) may be placed behind the back-bumper cover. Antennas 114 for short range sensing (e.g., for blind spot monitoring and side obstacle detection) may be placed behind the car fenders. Each antenna and each set of antennas may be grouped in one or more arrays. Each array may be controlled by a radar array controller (205). Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
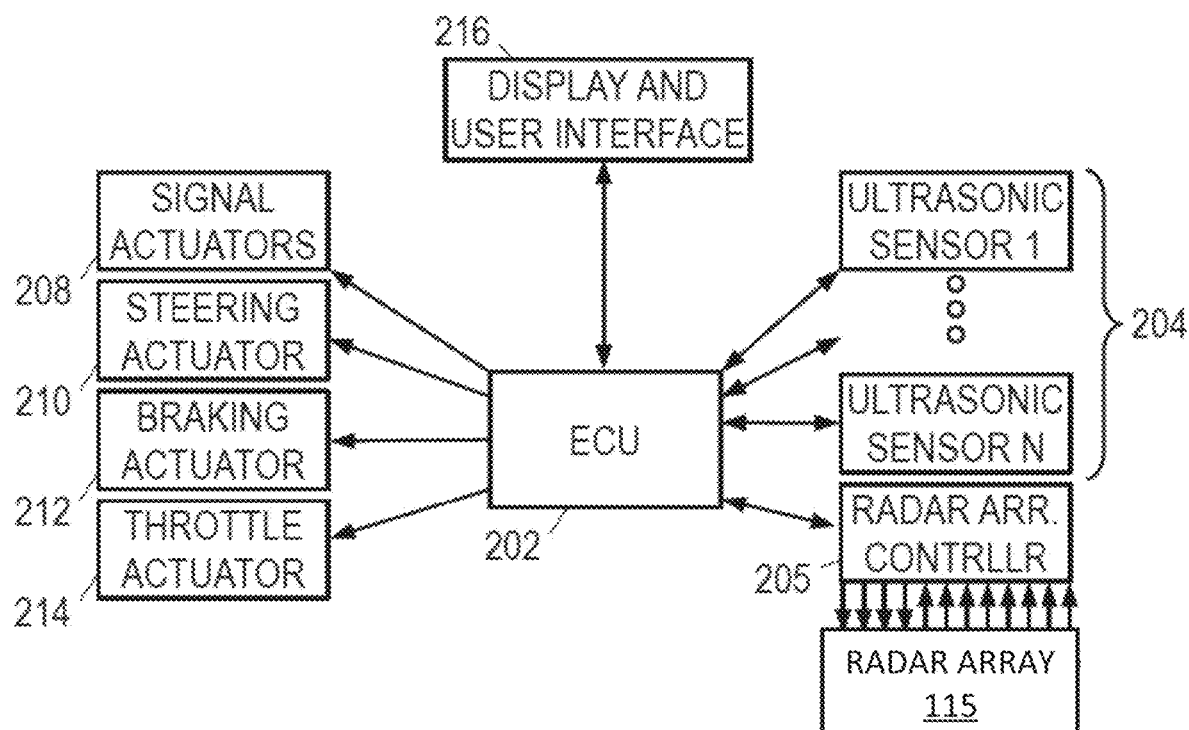
FIG. 2 is a block diagram of a driver-assistance system, in accordance with an example of this disclosure.

FIG. 2 shows an electronic control unit (ECU) 202 coupled to the various ultrasonic sensors 204 and a radar array controller 205 as the center of a star topology. Other topologies including serial, parallel, and hierarchical (tree) topologies, are also suitable and contemplated for use in accordance with the principles disclosed herein. The radar array controller 205 couples to the transmit and receive antennas in the radar antenna array 106 to transmit electromagnetic waves, receive reflections, and determine a spatial relationship of the vehicle to its surroundings. The radar array controller 205 couples to carrier signal generators. In at least one example, the radar array controller 205 controls the timing and order of actuation of a plurality of carrier signal generators.

To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more ECU 202, and may be used by the ECU 202 to determine the automobile's status. The ECU 202 may further act on the status and incoming information to actuate various signaling and control transducers to adjust and maintain the automobile's operation. Among the operations that may be provided by the ECU 202 are various driver-assist features including automatic parking, lane following, automatic braking, and self-driving.

To gather the necessary measurements, the ECU 202 may employ a MIMO radar system. Radar systems operate by emitting electromagnetic waves which travel outward from the transmit antenna before being reflected towards a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector and its velocity relative to the vehicle. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented.

Figure 3:
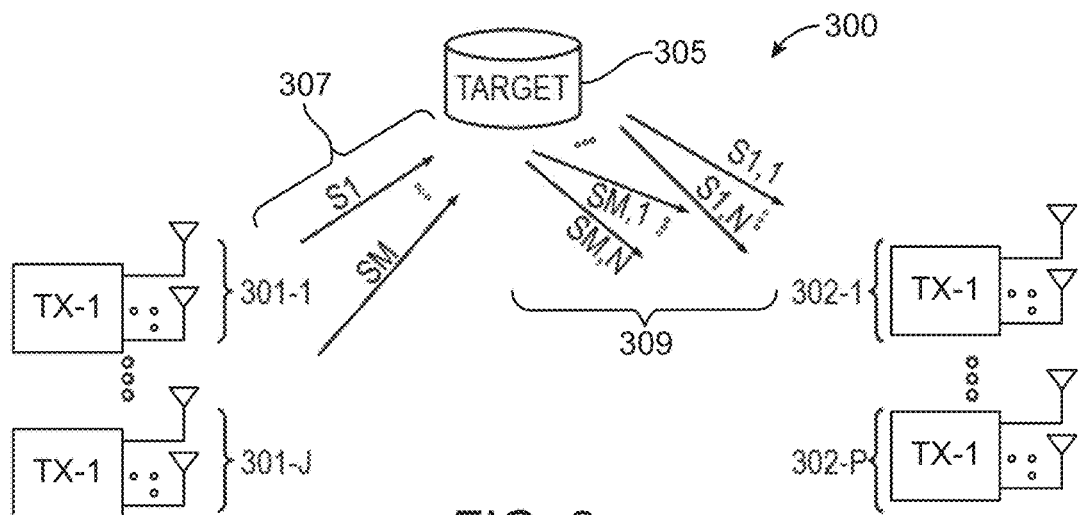
FIG. 3 illustrates a radar system, in accordance with an example of this disclosure.

FIG. 3 shows an illustrative radar system 300 having a MIMO configuration, in which J transmitters are collectively coupled to M transmit antennas 301 to send transmit signals 307. The M possible signals 307 may variously reflect from one or more targets to be received as receive signals 309 via N receive antennas 302 coupled to P receivers. Each receiver may extract the amplitude and phase or travel delay associated with each of the M transmit signals 307, thereby enabling the system to obtain N*M measurements (though only J*P of the measurements may be obtained concurrently). The processing requirements associated with each receiver extracting J measurements can be reduced via the use of time division multiplexing and/or orthogonal coding. The available antennas are systematically multiplexed to the available transmitters and receivers to collect the full set of measurements for radar imaging.

Figure 4:
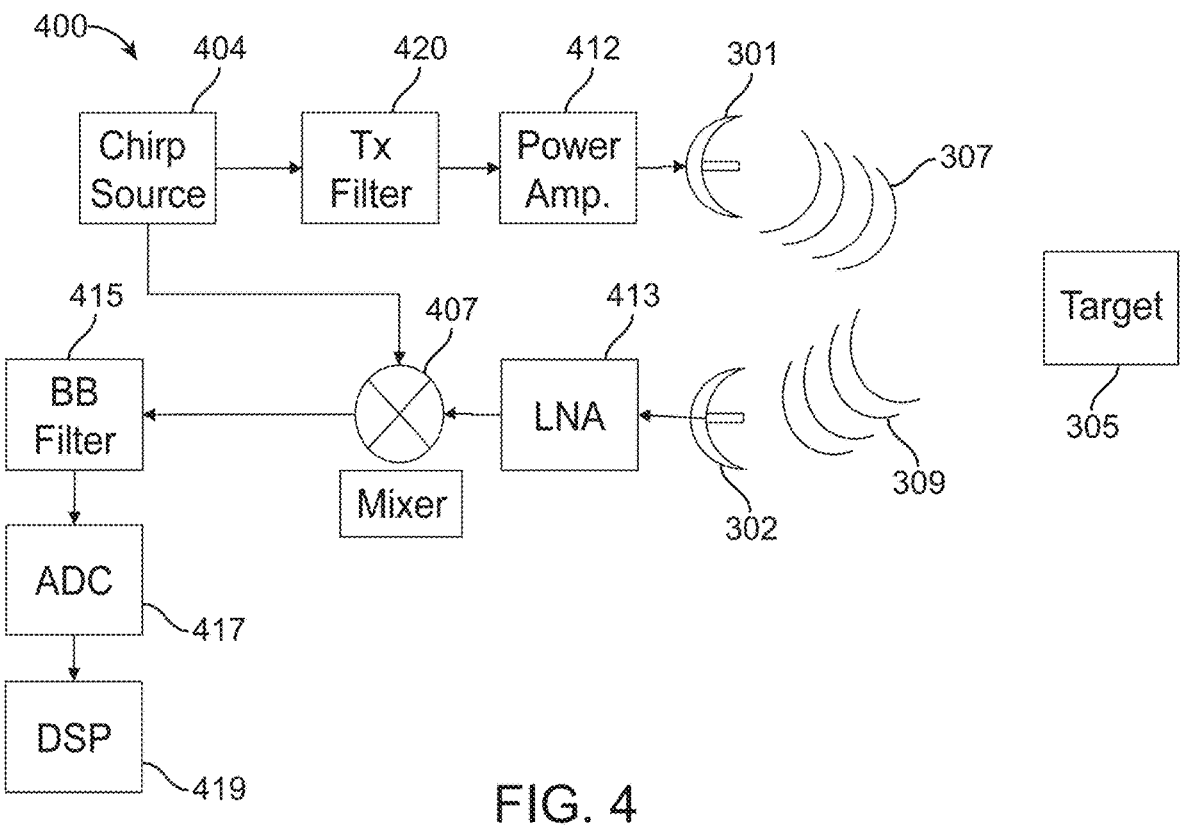
FIG. 4 is a block diagram of a radar system, in accordance with an example of this disclosure.

FIG. 4 illustrates a radar transceiver circuit 400 (e.g., 300) in block diagram form, in accordance with an example of this disclosure. In at least one example, the radar transceiver circuit 400 is implemented as an integrated circuit in a packaged chip. Radar transceiver circuit 400 includes a carrier signal generator 404, a transmission filter 420, an amplifier 412, and transmit antennas 301 which can transmit signals 307 (e.g., chirps 409) based on the output of the carrier signal generator 404. Radar transceiver circuit 400 also includes receiver antennas 302, a low noise amplifier 413, and a mixer 407. Mixer 407 mixes signals (e.g., 411) detected by antennas 302 with the signal from the carrier signal generator 404. Low noise amplifier 413 is used to amplify signals 411 detected by antennas 302. Radar transceiver circuit 402 also includes a sensitivity time controller and equalizer 413, a broadband filter 415, an analog-to-digital converter 417 and a processor 419 (e.g., 202, 205). The processor 419 and low noise amplifier 413 can be coupled for bi-directional communication as shown.

In examples of this disclosure, carrier signal generator 404 is coupled to the radar array controller 205. Carrier signal generator 404 includes a chirp generator to create a frequency-modulated continuous-wave (FMCW) signal. The chip rate of the carrier signal generator 404 may be controlled by the radar array controller 205. In at least one example, the carrier signal generator 404 can be deactivated by the radar array controller 205 to provide an unmodulated carrier signal. The carrier signal generator 404 may be implemented as a local oscillation (LO) signal generator as a fractional-N phase lock loop (PLL) with a ΣΔ controller, or as a direct-digital synthesis generator.

Carrier signal generator 404 is connected to transmit antennas 301 through transmission filter 420 and amplifier 412. Carrier signal generator 404 is connected to receiving antennas 302 through mixer 407 and low noise amplifier 413. Carrier signal generator 404 generates a signal (e.g., a chirp signal). Amplifier 412 receives the signal from carrier signal generator 404 and a transmission signal 307 corresponding to the signal from carrier signal generator 404 is transmitted using transmit antennas 301.

As noted, examples of this disclosure pertain to envelope modulation of chirp signals. In at least one example, an envelope coded FMCW transmitted signal at the frequency of $f_{RF}(t)$ is given by:

$$s_t(t) = A(t)e^{j(2\pi f_{RF}(t)t + \varphi_0 + \varphi_d(t))}, \quad (1)$$

where $j=\sqrt{-1}$, $\varphi_0$ is initial phase, and $\varphi_d(t)$ is phase variation due to Doppler shift, which is given by:

$$\varphi_d(t) = 2\pi f_d t = \frac{2\pi f_{RF} v t}{c_0}, \quad (2)$$

where v is a target's (e.g., 305) velocity and $c_0$ is speed of light. A(t) is an analog baseband envelope signal that is converted by a DAC from a digital baseband signal generated by a radar DSP unit 419. A(t) is given by:

$$A(t) = \Sigma_{i=0}^{N-1} A_i(t - iT_c), \quad (3)$$

where $A_i$ is the analog scale of FMCW signal that is generated by the DAC from the digital signal $\alpha_{i,q-1} \alpha_{i,q-2} \ldots \alpha_{i,1} \alpha_{i,0}$, and $T_c$ is chirp period. The reflected signal 309 received is given by:

$$s_r(t) = \alpha A(t-\tau)e^{j(2\pi f_{RF}(t-\tau) + \varphi_0 + \varphi_d(t))}, \quad (4)$$

where $\tau$ is the time delay of the reflected signal 309 and $\alpha$ is the attenuation factor corresponding to free-space propagation loss and radar system loss. After mixing with the LO signal of $s_{lo} = e^{j\omega_{RF}t}$, $s_r(t)$ is down-converted to an intermediate-frequency (IF) signal, as given by:

$$S_{IF}(t) = \alpha A(t-\tau)e^{j(2\pi f_{IF} + \varphi_0 + \varphi_d(t))}, \quad (5)$$

in which $f_{IF} = f_{RF}(t) - f_{RF}(t-\tau)$. In at least one example of this disclosure, the maximum detection range of FM-CW radar ensures that $\tau \ll T_c$. Thus, the following relationship holds:

$$A(t-\tau) \approx A(t), \quad (6)$$

The relationship of equation no. 6 implies that the magnitude pattern of the reflected signal well matches with the magnitude pattern of the transmitted signal after analog rescaling. In at least one example of this disclosure, analog magnitude rescaling is performed before envelope pattern matching because received signals have magnitude levels which vary in relation the target from which they were reflected. In one or more examples of this disclosure, each of M generated IF signals is individually transformed into the spectrum domain by applying the FFT. This processing can be called range FFT processing. Then, MC slices of the range FFT spectrums are obtained with respective to MC time stamps, e.g., $T_c, 2T_c, \ldots MC(T_c)$. Then, the maxima and minima of the magnitude of each peak (see e.g., $A_0, A_1, A_2$ in FIG. 8) over the M time stamps are detected and rescaled to be between zero and unity with the same number of levels used for the DAC in the envelope modulation. In at least one example of this disclosure, a transmitted radar waveform frame consists of MC chirps and the magnitude of each chirp signal is quantized into $2^Q$ levels as represented by a Q-bit digital signal, making the length of the transmitted signal's envelope pattern Q×MC. For detected signals, each magnitude peak in the range FFT spectrum produces an identical envelope pattern over MC time stamps for real targets after the rescaling. But for interfering sources, the envelope pattern will not match the transmitted signal. In at least one example, once false targets are recognized as such, data samples associated with those false targets in the range FFT spectrum are nulled before a velocity FFT is performed on the captured data, thereby preventing false targets from appearing in the velocity data.

Figure 5:
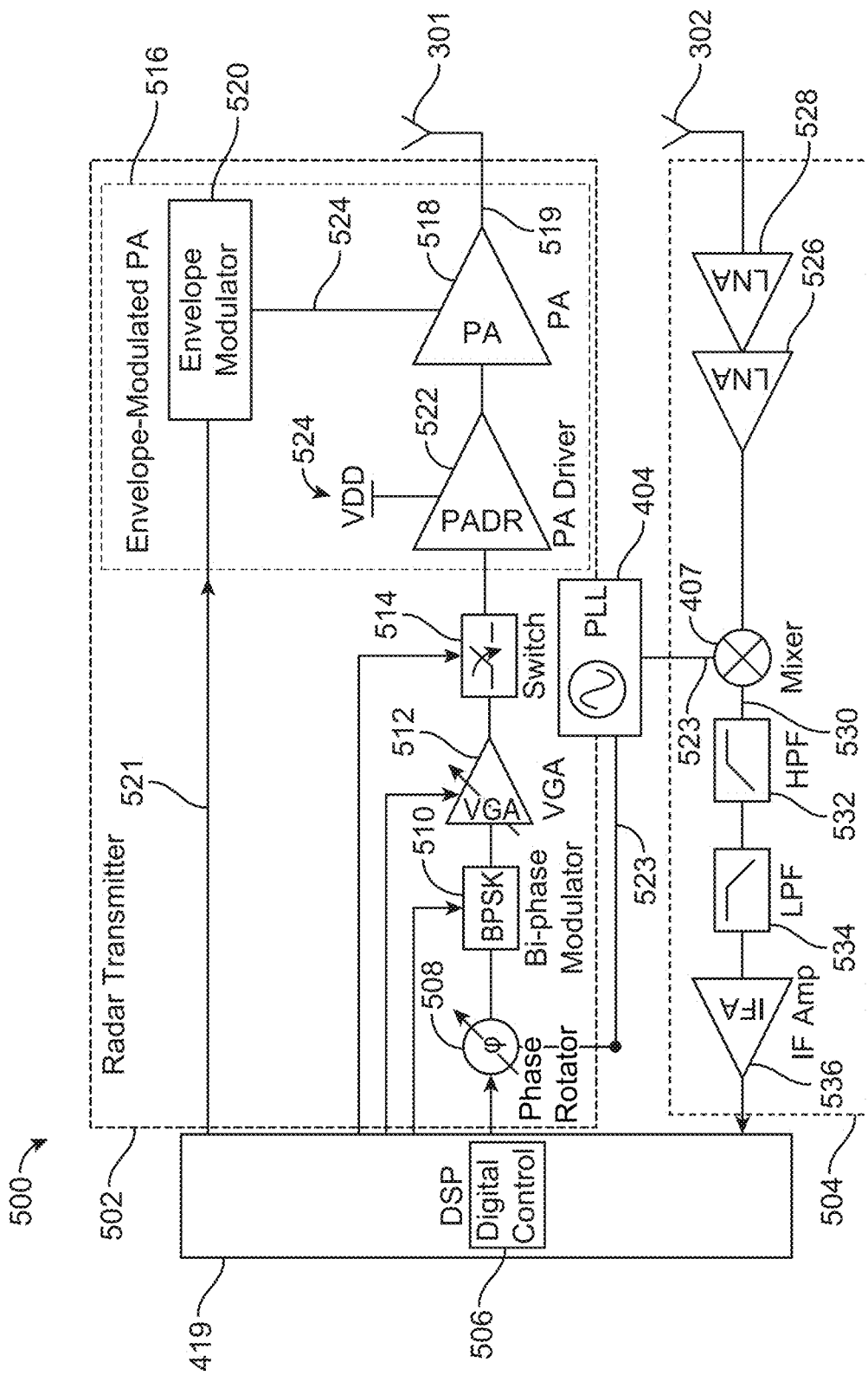
FIG. 5 is another block diagram of a radar system, in accordance with an example of this disclosure.

FIG. 5 illustrates a radar system 500 (e.g., 300, 400) in block diagram form, in accordance with an example of this disclosure. In at least one example, the radar system 500 is implemented as an integrated circuit in a packaged chip. The radar system 500 includes a transmitter 502 and a receiver 504 coupled to a signal generator 404. The transmitter 502 and the receiver 504 are coupled to the processor 419. As shown, the processor 419 can comprise a DSP and one or more digital controllers 506.

The transmitter 502 includes a phase rotator circuit 508, a bi-phase shift key modulator circuit 510, a variable gain amplifier (VGA) 512, a switch 514, and an envelope regulator circuit 516. The envelope regulator circuit 516 includes a power amplifier 518, an envelope modulation circuit 520, and a driver 522. The driver 522 is connected to a DC voltage supply 524. In at least one example of this disclosure, the envelope modulation circuit 520 includes a digital-to-analog converter (not shown). The envelope modulation circuit 520 receives digital signal control signals 521 (e.g., digital baseband signals) from the processor 419. The envelope modulation circuit 520 outputs an analog signal A(t) 524 to one or more power amplifiers 518. The transmitter 502 is coupled to a plurality of transmit antennas 301 by the one or more power amplifiers 518. In one or more examples of this disclosure, the transmit antennas 301 transmit signals (307) having an envelope pattern (see 621, FIG. 6).

The radar system 500 includes a plurality of receive antennas 302 which are coupled to a mixer 407 by low noise amplifier 526 and low noise amplifier 528. The phase rotator circuit 508 receives an oscillation (LO) signal 523 from the oscillation circuit 404. The mixer 407 receives a duplicate of the oscillation signal. The mixer 407 mixes the oscillation signal with the signals (309) detected by the receive antennas 302. The mixed signal 530 passes through a high pass filter 532, a low pass filter 534, and an intermediate frequency (IF) amplifier to the processor 419.

In at least one embodiment, the processor 419 generates and sends a digital baseband signal 521 to the envelope modulator 520. A digital-to-analog converter (e.g., 625) of the envelope modulator 520 converts the baseband signal 521 to an analog envelope signal (not shown), which the envelope modulator 520 scales. The scaled analog envelope signal 524 is received by power amplifier 518. Power amplifier 518 outputs a signal 519 for transmission to the transmit antenna 301. The envelope of signal 519 is modulated by the analog envelope signal 524 from the envelope modulator 520, and thus tracks the digital signal 521 from the processor.

Figure 6:
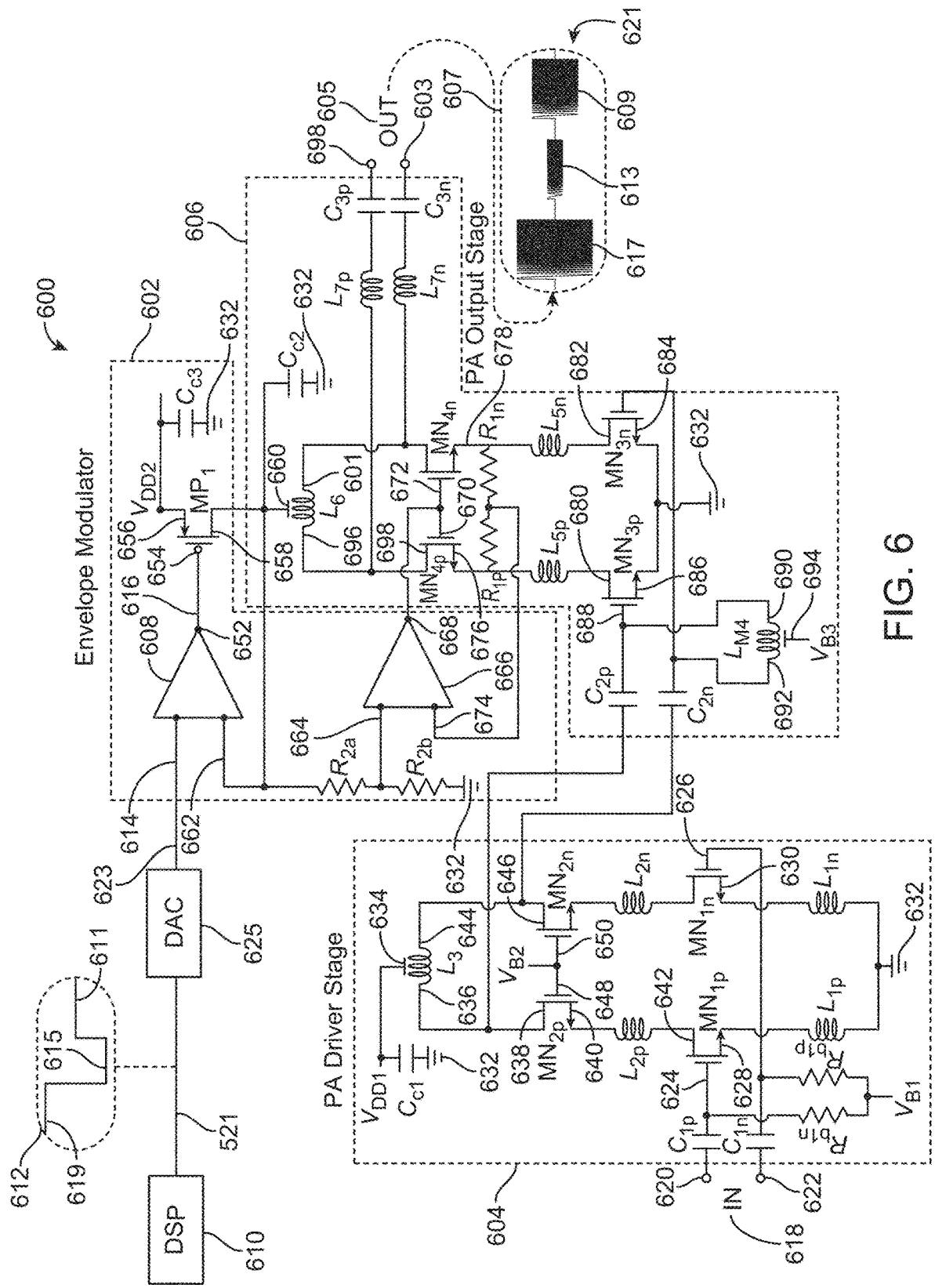
FIG. 6 illustrates aspects of a radar system, in accordance with an example of this disclosure.

FIG. 6 illustrates aspects of a radar system 600 (e.g., 300, 400, 500) in accordance with an example of this disclosure. The radar system 600 includes an envelope modulator 602 (e.g., 520), a power amplifier driver 604 (e.g. 522), and a power amplifier output circuit (e.g., 518). The envelope modulator 602 includes an operational amplifier 608 connected to a DSP 610 (e.g., 419). The DSP 610 sends a digital signal 612 to input 614 of operational amplifier 608. In at least one example of this disclosure, the digital signal 612 from the DSP 610 modulates the output of the operational amplifier 608.

The power amplifier driver 604 receives an input voltage 618 across a first input terminal 620 and a second input terminal 622. In at least one example, the voltage 618 across the input terminals 620, 622 comes from a signal source through switch (514). The first input terminal 622 is connected to a capacitor $C_{1p}$. Capacitor $C_{1p}$ is connected to the gate terminal 624 of a NMOS transistor $MN_{1p}$, and a resistor $R_{b1n}$. The second input terminal 622 is connected to a capacitor $C_{1n}$. Capacitor $C_{1n}$ is connected to a resistor $R_{b1p}$, and the gate terminal 626 of a NMOS transistor $MN_{1n}$. Resistor $R_{b1n}$ and resistor $R_{b1p}$ are both connected to a first DC voltage source $V_{B1}$.

The drain terminal 628 of NMOS transistor $MN_{1p}$ is connected to an inductor $L_{1p}$. The drain terminal 630 of NMOS transistor $MN_{1n}$ is connected to an inductor $L_{1n}$. Inductor $L_{1p}$ and inductor $L_{1n}$ connected to one another and to local ground 632. The power amplifier driver 602 also includes a DC voltage source $V_{DD1}$. DC voltage source $V_{DD1}$ is connected to a center cap terminal 634 of an inductor $L_3$ and a first charging capacitor $C_{c1}$. A first output terminal 636 of inductor $L_3$ is connected to the power amplifier output circuit 606 at capacitor $C_{2p}$. The first output terminal 636 of inductor $L_3$ is also connected to the source terminal 6388 of NMOS transistor $MN_{2p}$. The drain terminal 640 of NMOS transistor $MN_{2p}$ is connected to the source terminal 642 of NMOS transistor $MN_{1p}$ via inductor $L_{2p}$. The second output terminal 644 of inductor $L_3$ is connected to the source terminal of NMOS transistor $MN_{2n}$. The drain terminal of NMOS transistor $MN_{2n}$ is connected to the source terminal 646 of NMOS transistor $MN_{1n}$ via inductor $L_{2n}$. The second output terminal 644 of inductor $L_3$ is also connected to the power amplifier output circuit 606 at a capacitor $C_{2n}$. The gate terminal 648 of NMOS transistor $MN_{2p}$ is connected to the gate terminal 650 of NMOS transistor $MN_{2n}$ via DC voltage source $V_{B2}$.

The output terminal 652 of operational amplifier 608 is connected to the gate terminal 654 of PMOS transistor $MP_1$. The source terminal 656 of PMOS transistor $MP_1$ is connected to DC voltage source $V_{DD2}$ and to a charge capacitor $C_{c3}$, which is in turn connected to local ground 632. The drain terminal 658 of PMOS transistor $MP_1$ is connected to the center cap terminal 660 of inductor $L_6$ and to a second charge capacitor $C_{c2}$, which is in turn connected to local ground 632. The drain terminal 658 of PMOS transistor $MP_1$ is also connected to input terminal 662 of operational amplifier 608. The input terminal 662 of operational amplifier 608 and the drain terminal 658 of PMOS transistor $MP_1$ are also connected to resistor $R_{2a}$ and resistor $R_{2b}$. Resistor $R_{2b}$ is connected to local ground 632. Resistor $R_{2a}$ and resistor $R_{2b}$ are connected to a first (non-inverting) input terminal 664 of a second operational amplifier 666. The output terminal 668 of operational amplifier 666 is connected to the power amplifier circuit 606 at the gate terminal 670 NMOS transistor $MN_{2p}$ and the gate terminal 672 of NMOS transistor $MN_{2n}$. The negative input terminal 674 of operational amplifier 666 is connected to the drain terminal 676 of NMOS transistor $MN_{4p}$ via resistor $R_{1p}$, and connected to the drain terminal 678 of NMOS transistor $MN_{4n}$ via resistor $R_{1n}$. Resistor $R_{1p}$ is also connected to inductor $L_{5p}$, which connects NMOS transistor $MN_{4p}$ and resistor $R_{1p}$ to the source terminal 680 of NMOS transistor $MN_{3p}$. Resistor $R_{1n}$ is connected to the source terminal 682 of NMOS transistor $MN_{3n}$ via inductor $L_{5n}$. The drain terminal 684 of NMOS transistor $MN_{3n}$ and the drain terminal 686 of NMOS transistor $MN_{3p}$ are connected to one another and to local ground 632. Capacitor $C_{2p}$ is connected to the gate terminal 688 of NMOS transistor $MN_{3p}$ and to a first output terminal 690 of inductor $L_{M4}$. Capacitor $C_{2n}$ is connected to a second output terminal 692 of inductor $L_{M4}$. The center cap terminal 694 of inductor $L_{M4}$ is connected to DC voltage supply $V_{B3}$. A first output terminal 696 of inductor $L_6$ is connected the source terminal of NMOS transistor $MN_{4p}$ and inductor $L_{7p}$. Inductor $L_{7p}$ is connected to a first output terminal 698 via capacitor $C_{3p}$. A second output terminal 601 of inductor $L_6$ is connected to the source terminal of NMOS transistor $MN_{4n}$ and inductor $L_{7n}$. Inductor $L_{7n}$ is connected to a second output terminal 603 via capacitor C3n. The output 605 across terminal 698 and terminal 603 is an envelope regulated chirp signal 607 (e.g., 309). The envelope size of the first chirp 609 corresponds to a first (intermediate) binary value 611 of the signal 612 from DSP 610. The envelope size of the second chirp 613 corresponds to a second (lower) binary value 615 of the signal 612 from DSP 610. The envelope size of the third chirp 617 corresponds to a third (greater) binary value 619 of the signal 612 from DSP 610. The chirp signal 607 has an envelope pattern which tracks the signal 612 coming out of DSP 610.

DSP 610 generates digital baseband envelope signal 612 which is converted to corresponding analog signal 623 by digital-to-analog convertor 625. The analog envelope signal 623 is then received at terminal 614 of amplifier 608. The voltage signal 660 at the center tap terminal 660 of inductor L6 tracks the signal 612 (623). Meanwhile, the signal at the positive terminal 664 of the amplifier 666 is half the signal value 660 by using a resistor divider $R_{2a}$ and $R_{2b}$ and the voltage value 670 tracks the voltage value 660 with half its scale, ensuring that PA 606 operates at an optimal condition. Eventually, the envelope of the signal 605 tracks the signal 612.

Figure 7:
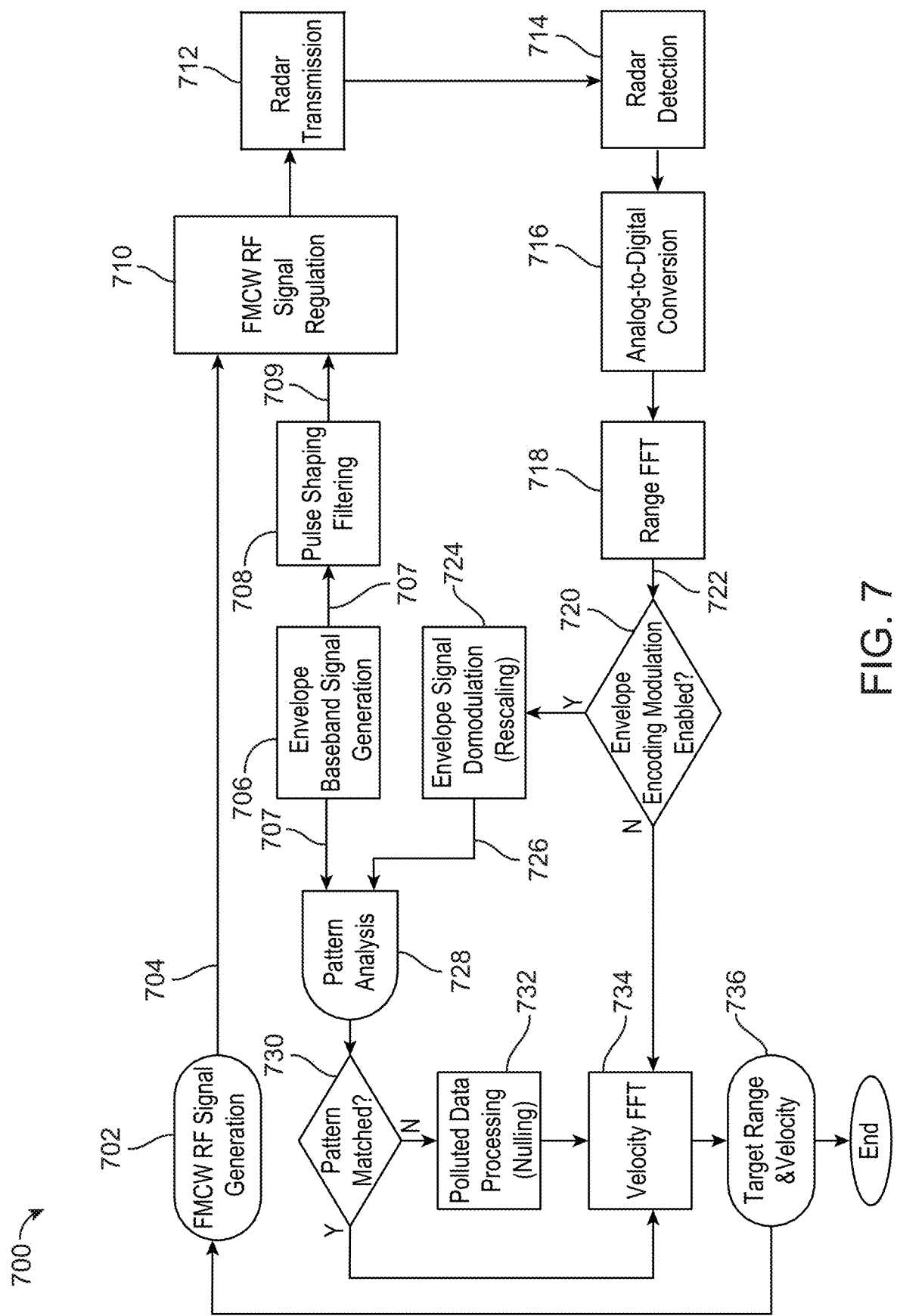
FIG. 7 illustrates a method of operating a radar system, in accordance with an example of this disclosure.

FIG. 7 illustrates a method 700 of operating a radar system (e.g., 300, 400, 500, 600) in accordance with an example of this disclosure. The method 700 includes generating 702 an FM-CW signal 704. An envelope baseband signal 707 is generated 704. One copy of the envelope baseband signal 707 is subjected 708 to pulse shaping filtering. The filtered signal 709 and the FM-CW signal 704 are then regulated 710 to produce a signal (e.g., 307, 607) which is transmitted 712 to detect the presence of one or more targets (305).

Signal regulation 710 can include suppressing one or more non-linear portions of a transmit signal (307) from an antenna (e.g., 114) of a first transmitter (e.g., 502) to reduce interference with signals transmitted by other antennas (e.g., 110) of that first transmitter. Signal regulation 710 can include suppressing one or more non-linear portions of a transmit signal (307) from an antenna (e.g., 114) of the first transmitter (e.g., 300) to reduce interference with signals transmitted by other antennas (e.g., 110) of a second (different) transmitter. In at least one example of this disclosure, the first transmitter and the second transmitter are of different radar systems (e.g., 500). Signal regulation 710 can additionally or alternatively include imposing an envelope pattern (621) on one or more portions of a transmit signal (307). Thereafter, the radar system detects one or more signals (309). The detected 714 signal (309) could be solely reflected by a target (305) or the detected 714 signal (309) could include extraneous signals (e.g., random noise, echo). The detected 714 signal (309) is converted 716 to a digital signal and FFT operations are performed 718, producing a modified signal 722. A determination is made 720 as to whether an envelope pattern (621) was applied 710 to the transmitted signal (307). If an envelope pattern (621) was applied 710 to the transmitted signal (307), the modified signal 722 is rescaled and demodulated 724. The patterns of the demodulated signal 726 and the envelope baseband signal 707 are then analyzed 728, and a determination is made 730 as to whether the patterns of signal 707 and signal 726 match (are statistically similar above a threshold). If signals 707 and 726 match, a velocity FFT operation is performed 734 on the demodulated signal 726. If signals 707 and 726 do not match, the demodulated signal 726, now identified as extraneous by the method 700 is nulled 732, and the method 700 proceeds perform 734 velocity FFT operations on non-extraneous portions of signal 722.

If it was determined 720 that envelope modulation was not applied during signal regulate 710, then signal 722 is subjected 734 to velocity FFT operations outright, as no demodulation is necessary. In either case, once velocity FFT operations are applied 734, the method produces 736 data concerning the target's (305) range and the target's (305) velocity. The method 700 can end or the method 700 can proceed to continue to generate 702 an FM-CW signal for target detection as described above.

In one or more examples of this disclosure, the radar system (e.g., 300, 400, 500, 600) is configured to perform MIMO operations. In one or more examples of this disclosure, the radar system (e.g., 300, 400, 500, 600) is configured to perform beam steering operations.

Figure 8:
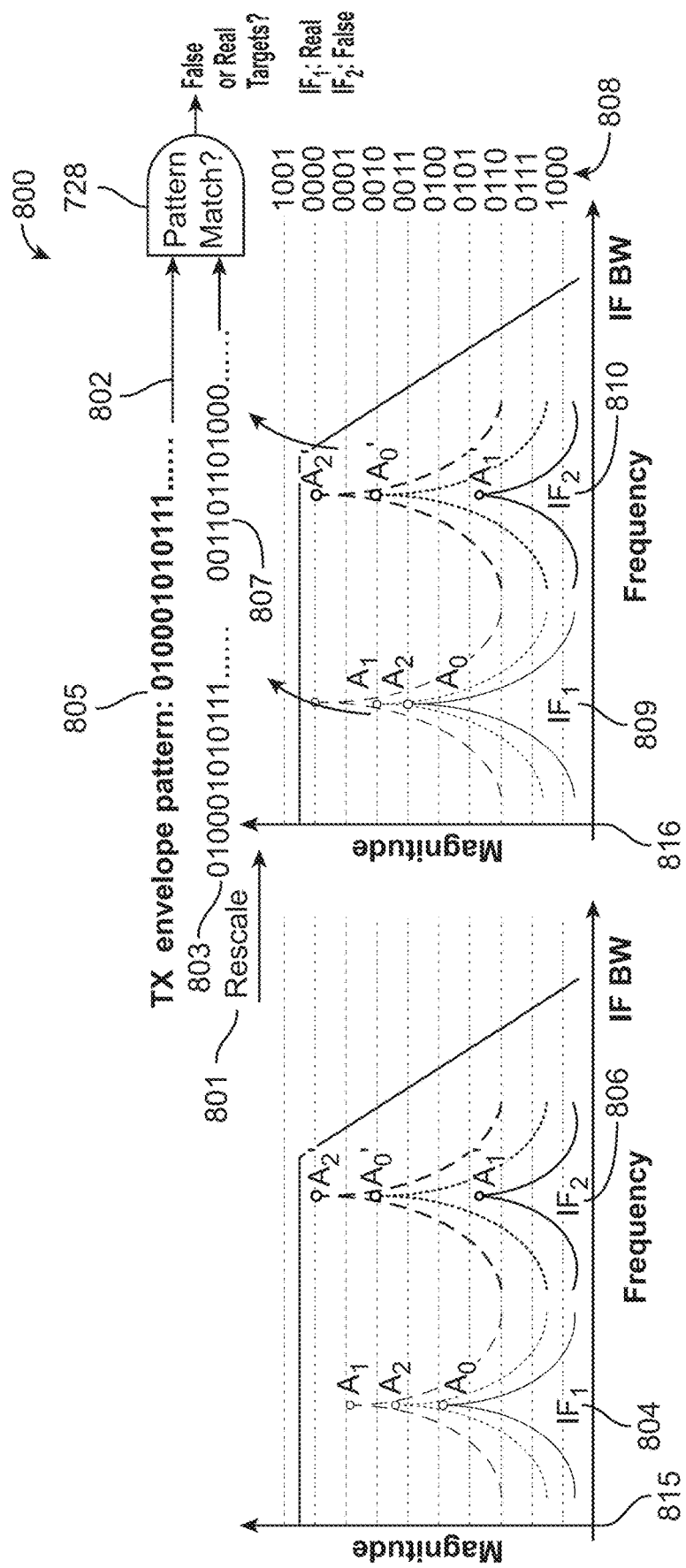
FIG. 8 illustrates aspects of a method of detecting radar interference, in accordance with an example of this disclosure.

FIG. 8 illustrates aspects of a method 800 (e.g. 700) of detecting radar interference, in accordance with an example of this disclosure. A transmitter (e.g., 502) transmits a signal 802 (307) comprising chirps whose amplitudes are regulated to different levels corresponding to different values (e.g., binary numbers). The stream of values makes up the envelope pattern 805 of the transmit signal 802). In method 800, a signal (309) is also detected (714) and, based on the detected signal (309), an intermediate frequency (IF) signal such as IF1 804 or IF2 806 is produced (722). The IF signal (e.g., 804, 806) is rescaled 801. The rescaled 801 (values of the) IF signal, such as IF1 809 or IF2 810, are compared to outgoing signal 802. If the values 803 of the properly scaled IF signal (e.g., 809) have the same pattern (621) as the outgoing signal 802, then the detected signal (309) corresponds to a real target (305). If, on the other hand, the values 807 of the properly scaled IF signal (e.g., 810) do not have the same pattern (621) as the outgoing signal 802, then the detected signal (309) is from a false target.

Figure 9A:
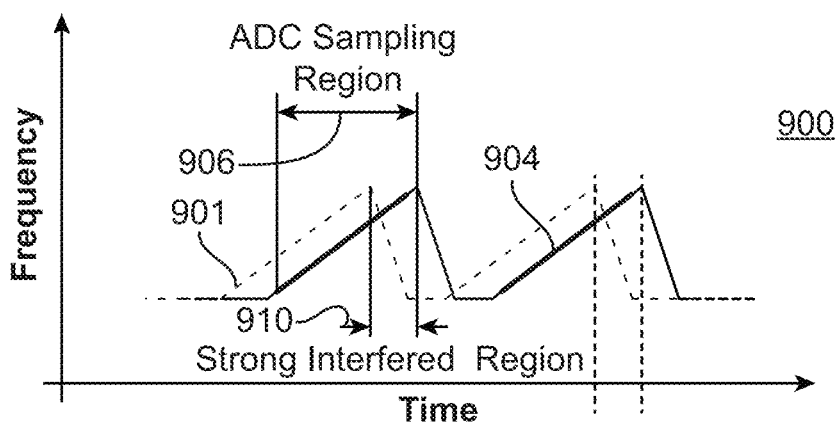
FIGS. 9A-B illustrate aspects of a method of minimizing radar interference, in accordance with an example of this disclosure.
Figure 9B:
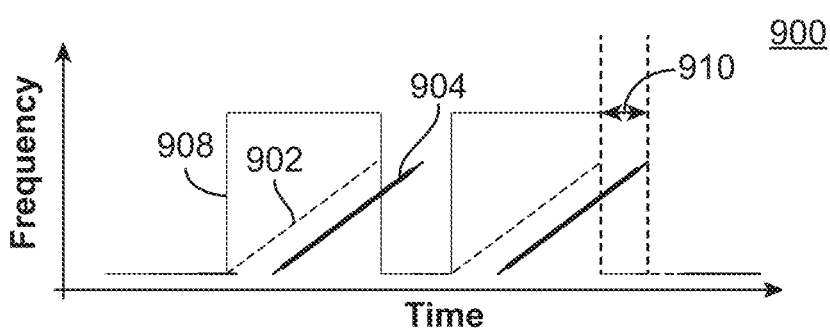

FIGS. 9A-B illustrate aspects of a method 900 of minimizing radar interference, in accordance with an example of this disclosure. The method involves regulating the envelope of a transmitted chirp signal 901 (307) of a first transmitter/antenna by suppressing a non-linear portion (e.g., 910) of the transmitted signal 901 using a square wave 908 generated by a modulator (e.g., 520) of the first transmitter. The non-linear portion of the transmit signal 901 has the potential to interfere with a signal 904 emitted by a different transmitter/antenna. The non-linear portion of the transmit signal 901 has the potential to interfere with a signal 904 emitted by a different transmitter/antenna during the time period(s) 906 in which the second signal 904 (as reflected by a target) is sampled by an ADC (e.g., 417) of a receiver (e.g., 504) corresponding to the different transmitter/antenna.

Figure 10A:
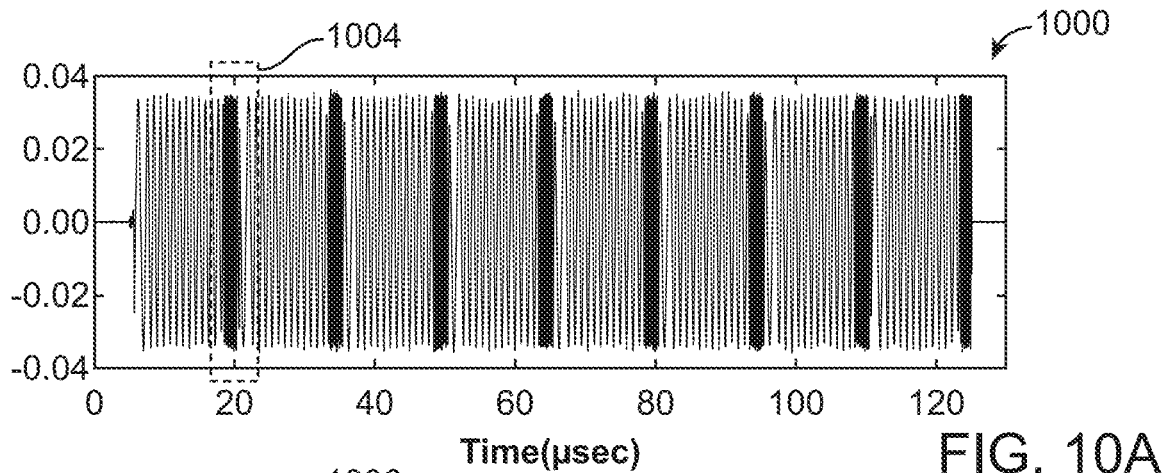
FIGS. 10A-B illustrate aspects of the method of minimizing radar interference of FIGS. 9A-B.
Figure 10B:
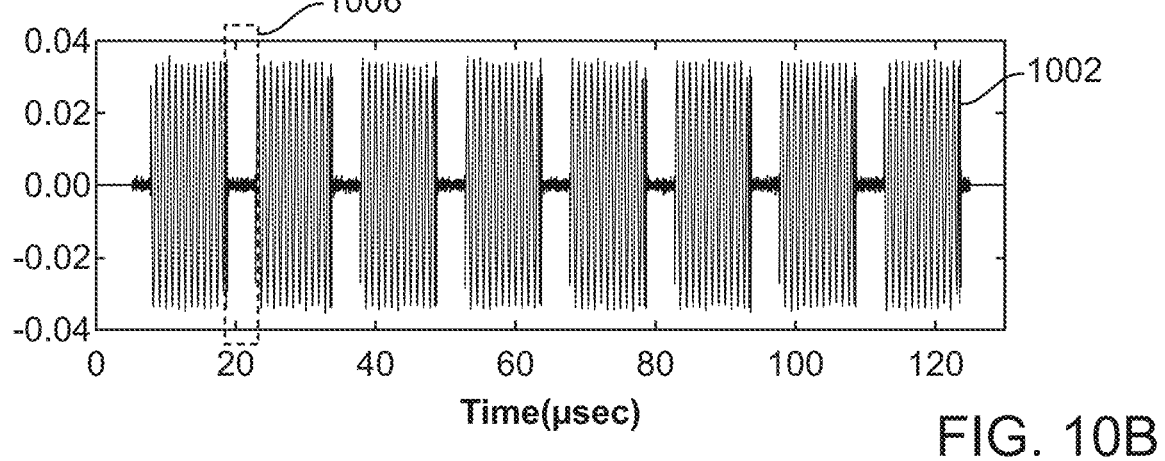

FIGS. 10A-B illustrate aspects of the method 900 of minimizing radar interference of FIGS. 9A-B. Time domain signal 1000 corresponds to unregulated frequency domain signal 901. The darker regions (e.g., 1004) of the time domain signal 1000 correspond to the non-linear (resettling) portions 910 of frequency domain signal 901. Time domain signal 1002 corresponds to regulated frequency domain signal 902. The regions (e.g., 1006) of the time domain signal 1002 in which the amplitude is close to zero (e.g., 1006), correspond to the suppressed (zeroed) portions 910 of frequency domain signal 902.

Figure 11A:
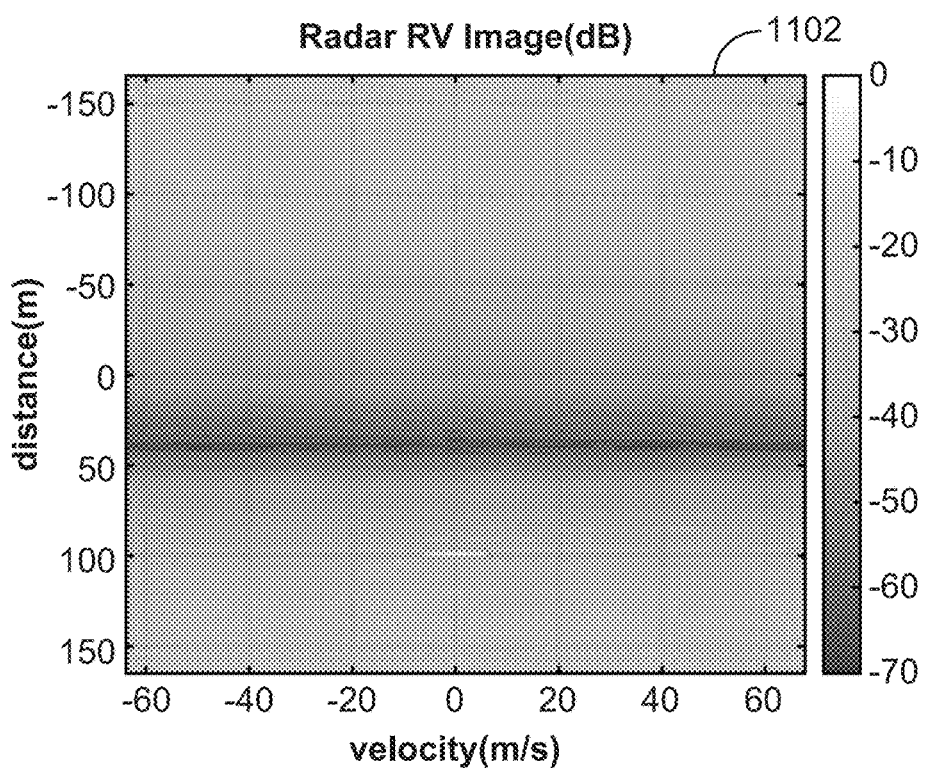
FIG. 11A is a radar image produced without the benefit of the method of minimizing radar interference of FIGS. 9A-B.

FIG. 11A illustrates a radar image 1102 corresponding to a transmitter whose transmit signal (904) has been interfered with by an interfering signal (e.g., 901).

Figure 11B:
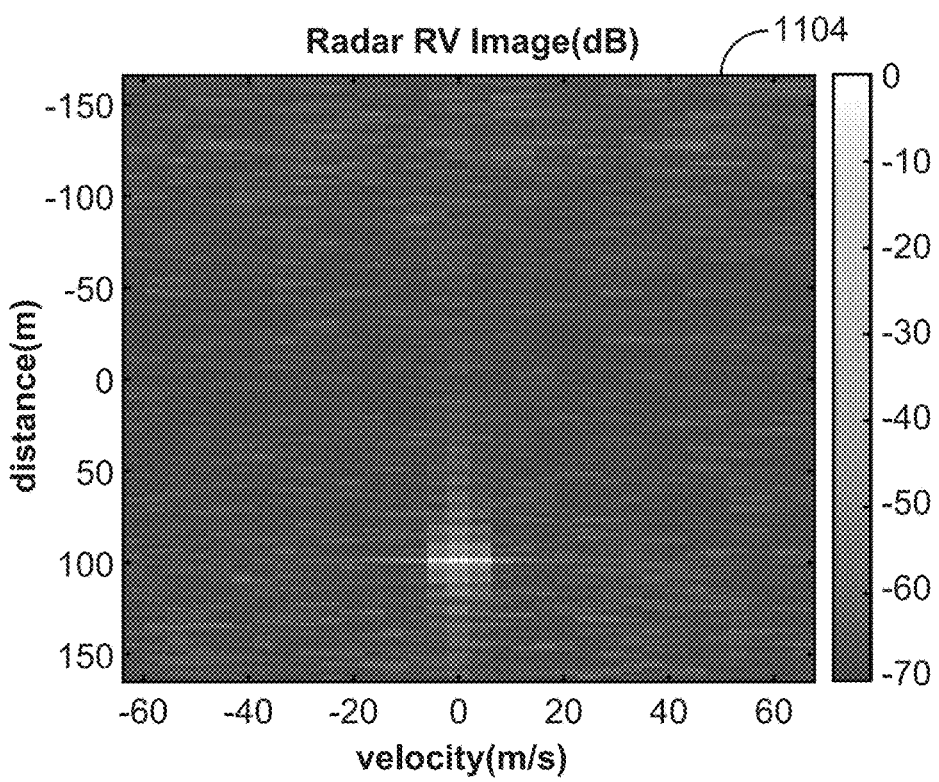
FIG. 11B is a radar image produced with the benefit of the method of minimizing radar interference of FIGS. 9A-B.

FIG. 11B is a radar image 1104 produced with the benefit of the method 900 of minimizing radar interference. Radar image 1104 corresponds to a transmitter whose transmit signal (904) has not been interfered with by an interfering signal (e.g., 901).

Examples of this disclosure include:

1. A transceiver system, comprising: a local oscillator configured to generate a chirp signal, wherein the chirp signal comprises a plurality of chirps, and wherein each of the chirps has a corresponding envelope; a transmitter, wherein the transmitter is configured to transmit a signal corresponding to the chirp signal; and a modulation circuit, wherein the modulation circuit is configured to modulate the transmitted signal by regulating a magnitude of one or more portions of the chirp envelopes in a predetermined pattern.

2. The transceiver system of example 1, further comprising: a receiver configured to detect one or more signals; and a processor configured to determine whether one or more detected signals has a pattern which matches the predetermined pattern of the transmitted signal.

3. The transceiver system of example 1, wherein regulating the magnitude of one or more portions of the chirp envelopes in the predetermined pattern comprises: setting a magnitude of one or more first envelopes in accordance with a first integer value; and setting a magnitude of one or more second envelopes in accordance with a second integer value, wherein the first integer value is different from the second integer value.

4. The transceiver system of example 3, wherein the first integer value and the second integer value correspond to binary numbers.

5. The transceiver system of example 1, wherein each of the chirps has a corresponding width, and wherein the modulation circuit is further configured to truncate a width of one or more of the chirps by imposing a rectangular wave on the chirp signal.

6. The transceiver system of example 5, wherein imposing the rectangular wave on the chirp signal sets a value of a non-linear portion of the transmitted signal to zero.

7. The transceiver system of example 1, wherein each of the chirps has a corresponding width, and wherein the modulation circuit is further configured to truncate a width of one or more of the chirps by applying a window function to the chirp signal.

8. A signal modulation method, comprising: generating a chirp signal using a local oscillator, wherein the chirp signal comprises a plurality of chirps, and wherein each of the chirps has a corresponding envelope; transmitting, using a transmitter, a signal corresponding to the chirp signal; and a modulating the transmitted signal, using a modulation circuit, wherein modulating the transmitted comprises regulating a magnitude of one or more portions of the chirp envelopes in a predetermined pattern.

9. The signal modulation method of example 8, further comprising: detecting one or more signals at a receiver; and determining, at a processor, whether one or more detected signals has a pattern which matches the predetermined pattern of the transmitted signal.

10. The signal modulation method of example 8, wherein regulating the magnitude of one or more portions of the chirp envelopes in the predetermined pattern comprises: setting a magnitude of one or more first envelopes in accordance with a first integer value; and setting a magnitude of one or more second envelopes in accordance with a second integer value, wherein the first integer value is different from the second integer value.

11. The signal modulation method of example 10, wherein the first integer value and the second integer value correspond to binary numbers.

12. The signal modulation method of example 8, the method further comprising reducing a width of one or more of the chirps by imposing a rectangular wave on the chirp signal.

13. The signal modulation method of example 12, wherein imposing the rectangular wave on the chirp signal sets a value of a non-linear portion of the transmitted signal to a fixed value.

14. The signal modulation method of example 8, further comprising reducing a width of one or more of the chirps by applying window function to the chirp signal.

15. A non-transitory computer readable medium storing instructions executable by a processor, wherein the instructions comprise instructions to: generate a chirp signal using an oscillation circuit, wherein the chirp signal comprises a plurality of chirps, and wherein each of the chirps has a corresponding envelope; transmit a signal corresponding to the chirp signal from a transmitter; and cause a modulation circuit to modulate the transmitted signal by regulating a magnitude of one or more portions of the chirp envelopes in a predetermined pattern.

16. The non-transitory computer readable medium of example 15, wherein the instructions further comprise instructions to: detect one or more signals using a receiver; and determine whether one or more detected signals has a pattern which matches the predetermined pattern of the transmitted signal.

17. The non-transitory computer readable medium of example 15, wherein regulating the magnitude of one or more portions of the chirp envelopes in the predetermined pattern comprises: setting a magnitude of one or more first envelopes in accordance with a first integer value; and setting a magnitude of one or more second envelopes in accordance with a second integer value, wherein the first integer value is different from the second integer value.

18. The non-transitory computer readable medium of example 17, wherein the first integer value and the second integer value correspond to binary numbers.

19. The non-transitory computer readable medium of example 15, wherein the instructions further comprise instructions to cause the modulation circuit to truncate a width of one or more of the chirps by imposing a square wave on the chirp signal.

20. The non-transitory computer readable medium of example 19, wherein imposing the square wave on the chirp signal sets a value of a non-linear portion of the transmitted signal to zero.

21. The non-transitory computer readable medium of example 15, wherein the instructions further comprise instructions to cause the modulation circuit to truncate a width of one or more of the chirps by applying a window function to the chirp signal.

22. The non-transitory computer readable medium of example 16, wherein the window function comprises a Hann function or a Blackman function or both.

Though the operations described herein may be set forth sequentially for explanatory purposes, in practice the method may be carried out by multiple components operating concurrently and perhaps even speculatively to enable out-of-order operations. The sequential discussion is not meant to be limiting. Moreover, the focus of the foregoing discussions has been radar sensors, but the principles are applicable to any pulse-echo or continuous-wave travel time measurement systems. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A transceiver system, comprising:
   a local oscillator configured to generate a chirp signal, wherein the chirp signal comprises a plurality of chirps, and wherein each of the chirps has a corresponding envelope;
   a transmitter, wherein the transmitter is configured to transmit a signal corresponding to the chirp signal; and
   a modulation circuit, wherein the modulation circuit is configured to modulate the transmitted signal by regulating a magnitude of one or more portions of the chirp envelopes in a predetermined pattern, wherein the modulation suppresses a non-linear portion of the transmitted signal to zero or a fixed value.

2. The transceiver system of claim 1, further comprising:
   a receiver configured to detect one or more signals; and
   a processor configured to determine whether one or more detected signals has a pattern which matches the predetermined pattern of the transmitted signal.

3. The transceiver system of claim 1, wherein regulating the magnitude of one or more portions of the chirp envelopes in the predetermined pattern comprises:
   setting a magnitude of one or more first envelopes in accordance with a first integer value; and
   setting a magnitude of one or more second envelopes in accordance with a second integer value,
   wherein the first integer value is different from the second integer value.

4. The transceiver system of claim 3, wherein the first integer value and the second integer value correspond to binary numbers.

5. The transceiver system of claim 1, wherein each of the chirps has a corresponding width, and wherein the modulation circuit is further configured to truncate a width of one or more of the chirps by imposing a rectangular wave on the chirp signal.

6. The transceiver system of claim 1, wherein the non-linear portion of the transmitted signal is associated with resettling.

7. The transceiver system of claim 1, wherein each of the chirps has a corresponding width, and wherein the modulation circuit is further configured to truncate a width of one or more of the chirps by applying a window function to the chirp signal.

8. A signal modulation method, comprising:
generating a chirp signal using a local oscillator, wherein the chirp signal comprises a plurality of chirps, and wherein each of the chirps has a corresponding envelope;
transmitting, using a transmitter, a signal corresponding to the chirp signal; and
a modulating the transmitted signal, using a modulation circuit, wherein modulating the transmitted comprises regulating a magnitude of one or more portions of the chirp envelopes in a predetermined pattern, wherein the modulation suppresses a non-linear portion of the transmitted signal to zero or a fixed value.

9. The signal modulation method of claim 8, further comprising:
detecting one or more signals at a receiver; and
determining, at a processor, whether one or more detected signals has a pattern which matches the predetermined pattern of the transmitted signal.

10. The signal modulation method of claim 8, wherein regulating the magnitude of one or more portions of the chirp envelopes in the predetermined pattern comprises:
setting a magnitude of one or more first envelopes in accordance with a first integer value; and
setting a magnitude of one or more second envelopes in accordance with a second integer value,
wherein the first integer value is different from the second integer value.

11. The signal modulation method of claim 10, wherein the first integer value and the second integer value correspond to binary numbers.

12. The signal modulation method of claim 8, the method further comprising reducing a width of one or more of the chirps by imposing a rectangular wave on the chirp signal.

13. The signal modulation method of claim 8, wherein the non-linear portion of the transmitted signal is associated with resettling.

14. The signal modulation method of claim 8, further comprising reducing a width of one or more of the chirps by applying window function to the chirp signal.

15. A non-transitory computer-readable storage medium for use with an electronic device, the computer-readable storage medium storing instructions executable by a processor, wherein, when executed by the processor, the instructions cause the electronic device to perform operations comprising:
generating a chirp signal using an oscillation circuit, wherein the chirp signal comprises a plurality of chirps, and wherein each of the chirps has a corresponding envelope;
transmitting a signal corresponding to the chirp signal from a transmitter; and
causing a modulation circuit to modulate the transmitted signal by regulating a magnitude of one or more portions of the chirp envelopes in a predetermined pattern, wherein the modulation suppresses a non-linear portion of the transmitted signal to zero or a fixed value.

16. The non-transitory computer-readable storage medium of claim 15, wherein the operations further comprise:
detecting one or more signals using a receiver; and
determining whether one or more detected signals has a pattern which matches the predetermined pattern of the transmitted signal.

17. The non-transitory computer-readable storage medium of claim 15, wherein regulating the magnitude of one or more portions of the chirp envelopes in the predetermined pattern comprises:
setting a magnitude of one or more first envelopes in accordance with a first integer value; and
setting a magnitude of one or more second envelopes in accordance with a second integer value,
wherein the first integer value is different from the second integer value.

18. The non-transitory computer-readable storage medium of claim 17, wherein the first integer value and the second integer value correspond to binary numbers.

19. The non-transitory computer-readable storage medium of claim 15, wherein the operations further comprise causing the modulation circuit to truncate a width of one or more of the chirps by imposing a square wave on the chirp signal.

20. The non-transitory computer-readable storage medium of claim 15, wherein the non-linear portion of the transmitted signal is associated with resettling.

21. The non-transitory computer-readable storage medium of claim 15, wherein the operations further comprise causing the modulation circuit to truncate a width of one or more of the chirps by applying a window function to the chirp signal.

22. The non-transitory computer-readable storage medium of claim 21, wherein the window function comprises at least one of a Hann function or a Blackman function.

* * * * *